(12) United States Patent
Haug et al.

(10) Patent No.: US 10,844,971 B2
(45) Date of Patent: Nov. 24, 2020

(54) SHROUDED VALVE ASSEMBLY

(71) Applicant: AIRBUS OPERATIONS GMBH, Hamburg (DE)

(72) Inventors: Manfred Haug, Hamburg (DE); Michael Rappitsch, Hamburg (DE); Konrad Rauch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 181 days.

(21) Appl. No.: 15/581,690

(22) Filed: Apr. 28, 2017

(65) Prior Publication Data

US 2017/0314697 A1 Nov. 2, 2017

(30) Foreign Application Priority Data

Apr. 29, 2016 (EP) .................................... 16167680

(51) Int. Cl.
*F16K 27/02* (2006.01)
*B64D 37/00* (2006.01)
*F16K 1/22* (2006.01)

(52) U.S. Cl.
CPC ........ *F16K 27/0218* (2013.01); *B64D 37/005* (2013.01); *F16K 1/22* (2013.01)

(58) Field of Classification Search
CPC ............................... B64D 37/005; F16K 1/22
(Continued)

(56) References Cited

U.S. PATENT DOCUMENTS

| 1,279,900 A | 9/1918 | Pearsall |
| 4,925,218 A * | 5/1990 | Kunz ........................ F16L 9/18 |
| | | 285/123.1 |
| 5,018,548 A * | 5/1991 | McLennan .......... F16K 27/0218 |
| | | 137/315.23 |
| 5,947,151 A * | 9/1999 | Shafer ....................... F17D 5/04 |
| | | 137/375 |

(Continued)

FOREIGN PATENT DOCUMENTS

| CA | 647005 A | 8/1962 |
| EP | 0207015 A2 | 12/1986 |

(Continued)

OTHER PUBLICATIONS

Extended European Search Report for Application No. 16167680 dated Oct. 14, 2016.

(Continued)

*Primary Examiner* — Angelisa L. Hicks
(74) *Attorney, Agent, or Firm* — Jenkins, Wilson, Taylor & Hunt, P.A.

(57) ABSTRACT

A shrouded valve assembly including a valve, valve pipe and valve channel. A valve member can regulate flow of fluid through the valve channel. A valve shroud provides a valve shroud chamber and includes first and second valve shroud members fixed via valve shroud member flanges. An actuator shaft passes through the valve shroud and the valve pipe to the valve member and can move to operate the valve member to regulate flow of fluid through the valve channel. The actuator shaft extends in an actuator shaft direction passing through the valve shroud and the valve pipe. The valve shroud flanges meet at a valve shroud interface inclined at an acute angle to the actuator shaft direction. The actuator shaft passes through the first valve shroud member and not the second valve shroud member, enabling the valve to be inspected by disassembling this interface without disassembling the valve shroud members.

14 Claims, 4 Drawing Sheets

(58) Field of Classification Search
USPC .......................................................... 137/248
See application file for complete search history.

(56) References Cited

U.S. PATENT DOCUMENTS

| | | | |
|---|---|---|---|
| 2007/0051406 A1* | 3/2007 | Carns | ........................ F16K 1/22 137/312 |
| 2008/0265196 A1 | 10/2008 | Hoffman | |
| 2011/0233923 A1 | 9/2011 | Kouketsu et al. | |
| 2014/0284426 A1* | 9/2014 | Erickson | ................... B64C 1/06 244/135 R |
| 2017/0314696 A1 | 11/2017 | Haug et al. | |

FOREIGN PATENT DOCUMENTS

| | | |
|---|---|---|
| EP | 1731810 A2 | 12/2006 |
| EP | 2251582 A1 | 11/2010 |
| EP | 3239582 A1 | 11/2017 |
| EP | 3239582 B1 | 2/2019 |
| FR | 1369501 A | 8/1964 |
| FR | 2978521 A1 | 2/2013 |
| GB | 2365949 A | 2/2002 |
| WO | WO 95/20737 A2 | 8/1995 |

OTHER PUBLICATIONS

European Search Report for Application No. 16167679.6 dated Oct. 31, 2016.
Non-Final Office Action for U.S. Appl. No. 15/581,672 dated Jun. 29, 2018.
Final Office Action for U.S. Appl. No. 15/581,672 dated Feb. 7, 2019.
Non-Final Office Action for U.S. Appl. No. 15/581,672 dated Jan. 8, 2020.

* cited by examiner

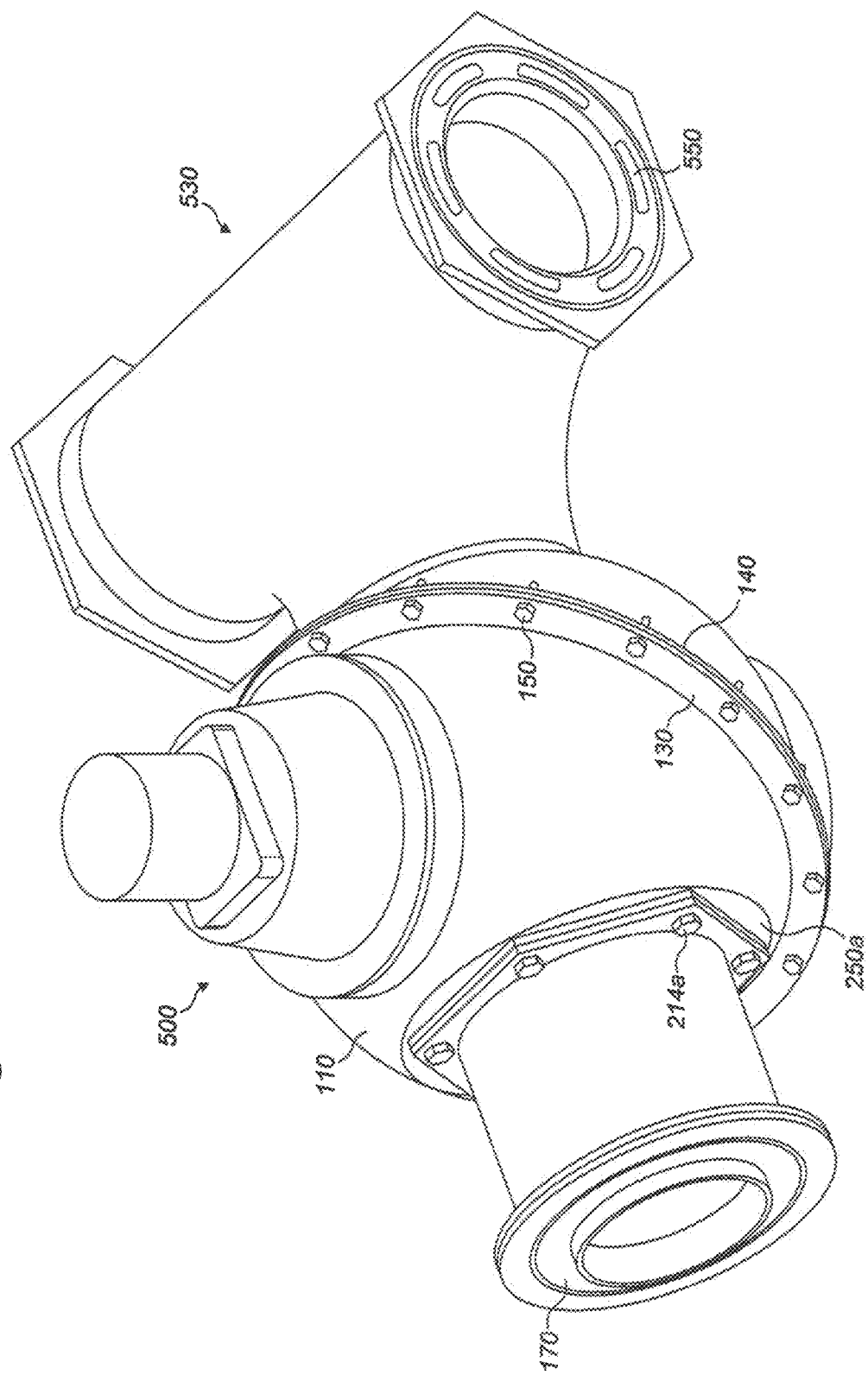

SHROUDED VALVE ASSEMBLY

CROSS-REFERENCE TO RELATED APPLICATION

This application claims priority to European Patent Application EP 16 167 680.4 filed Apr. 29, 2016, the entire disclosure of which is incorporated by reference herein.

TECHNICAL FIELD

The present disclosure relates to a shrouded valve assembly.

BACKGROUND

A known shrouded valve assembly is described in EP-A-1731810. An inner conduit is disposed within an outer conduit, and a valve member is operable to regulate flow through the inner conduit. In one embodiment the valve apparatus is fabricated by joining two parts together to form a flange. The valve apparatus is connected between two fluid-conducting apparatus at joints which may be substantially fixed or may be flexible.

SUMMARY

The disclosure herein provides a shrouded valve assembly. The shrouded valve assembly comprises a valve with a valve pipe and a valve channel. A valve member in the valve channel is operable to regulate a flow of fluid through the valve channel. A valve shroud shrouds the valve pipe and provides a valve shroud chamber between the valve pipe and the valve shroud. The valve shroud comprises first and second valve shroud members which are fixed to each other via respective valve shroud member flanges. An actuator shaft passes through the valve shroud and the valve pipe to the valve member and can move to operate the valve member to regulate the flow of fluid through the valve channel. The actuator shaft extends in an actuator shaft direction as it passes through the valve shroud and the valve pipe. The valve shroud flanges meet at a valve shroud interface which is inclined at an acute angle to the actuator shaft direction. The acute angle is preferably greater than 40 degrees and less than 50 degrees. The actuator shaft passes through the first valve shroud member but not through the second valve shroud member. This enables a simple interface to be provided between the actuator shaft and the first valve shroud member, and also enables the valve to be inspected by disassembling this interface without having to disassemble the pair of valve shroud members.

Preferably each valve shroud member has a substantially spherical inner surface which defines an outer boundary of the valve shroud chamber. This avoids any local accumulation of liquid in the chamber. Each valve shroud member typically also has a substantially spherical outer surface.

A drain port fitting may be fitted to the second valve shroud member, wherein the drain port fitting is configured to enable liquid to be drained out of the valve shroud chamber through the drain port fitting. Securing the drain port fitting to the second valve shroud member but not the first valve shroud member enables a simple interface to be provided between the drain port fitting and the second valve shroud member, and also enables the drain port fitting to be removed without having to disassemble the valve shroud members.

Typically the valve channel extends in a valve channel direction, and the valve shroud interface is inclined at an acute angle to the valve channel direction as well as being inclined at an acute angle to the to the actuator shaft direction.

The valve shroud interface may have a complex shape, but more typically it lies in a single plane, and this single plane is inclined at the acute angle to the actuator direction.

The first and second valve shroud members may be fixed to each other by a clamp, or more typically by removable fasteners passing through the valve shroud member flanges.

First and second shrouded pipe assemblies may be attached to the valve shroud, each shrouded pipe assembly comprising a pipe in fluid communication with a respective end of the valve channel, and a pipe shroud which shrouds the pipe and provides a pipe shroud chamber between the pipe and the pipe shroud. Typically the pipe of each shrouded pipe assembly is in fluid communication with a respective end of the valve channel through one of the valve shroud members but not the other.

The first and second shrouded pipe assemblies are typically connected to the valve shroud by respective first and second connections and to the valve by respective third and fourth connections. The third or fourth connection may be more flexible than both the first connection and the second connection, in order to prevent load from passing through the third or fourth connection into the valve.

BRIEF DESCRIPTION OF THE DRAWINGS

Example embodiments of the disclosure herein will now be described with reference to the accompanying drawings, in which:

FIG. 3 is an isometric view of a shrouded valve assembly according to a third embodiment of the disclosure herein;

DETAILED DESCRIPTION

Figure 1:
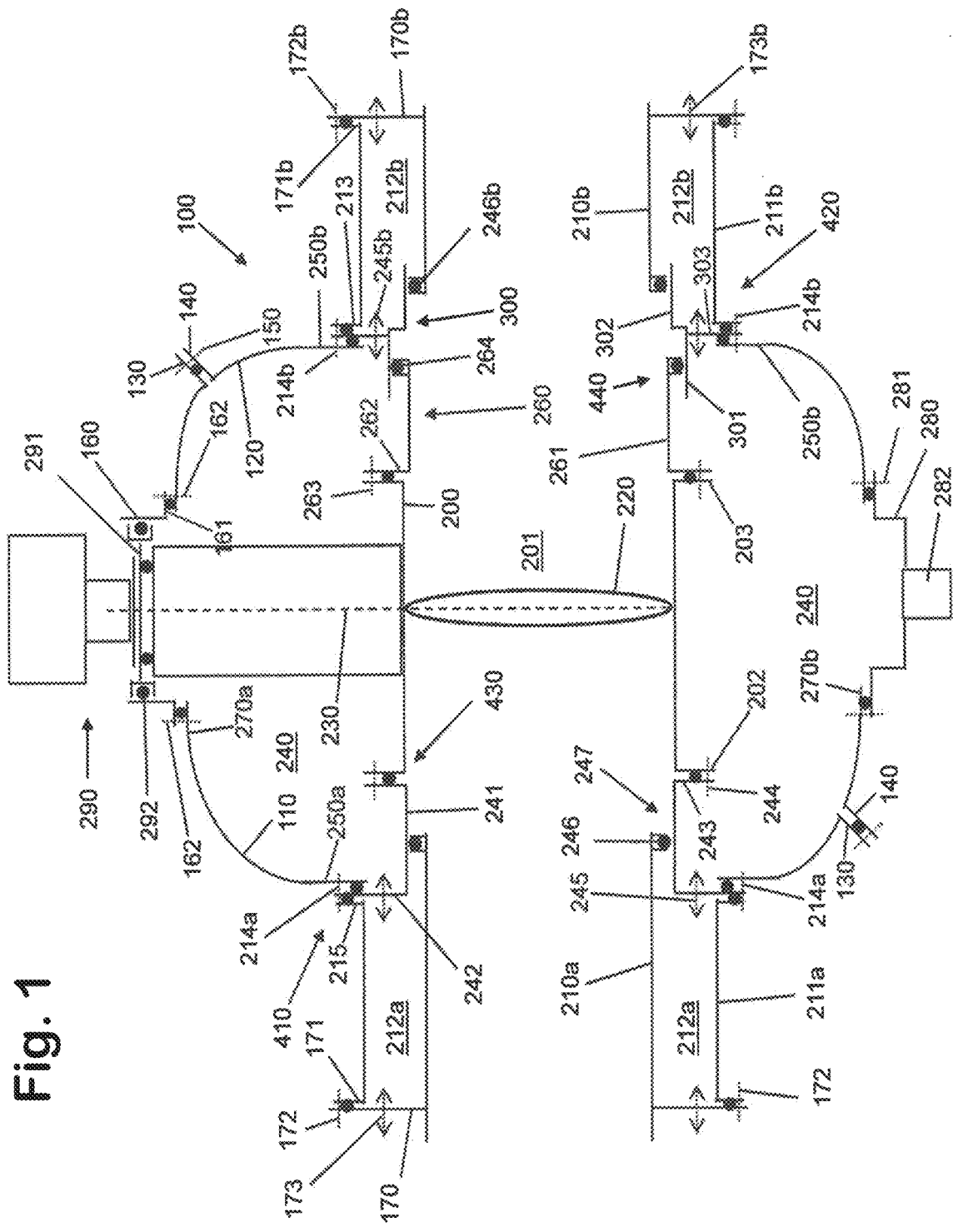
FIG. 1 is a schematic sectional view of a shrouded valve assembly according to a first embodiment of the disclosure herein.

A shrouded valve assembly 100 according to a first embodiment of the disclosure herein is shown in FIG. 1. The assembly comprises a butterfly valve comprising a valve pipe 200 with a valve channel 201, and a valve member 220 in the valve channel. The valve member 220 is carried on an actuator shaft 230 which can be rotated to regulate a flow of fuel through the valve channel. More specifically the valve member 220 can be oriented at right angles to the flow to fill the valve channel 201 and block the flow—or rotated to lie parallel with the flow so the fuel can flow through the channel on either side of the valve member 220. The valve member 220 is shown in FIG. 1 oriented at an oblique angle.

The actuator shaft 230 extends in an actuator shaft direction which is vertical in FIG. 1, at right angles to the horizontal flow axis of the valve channel 201. A valve shroud 110, 120 shrouds the valve pipe 200, and provides a valve shroud chamber 240 between the valve pipe 200 and the valve shroud 110, 120.

The valve shroud comprises a pair of identical valve shroud members 110, 120. The valve shroud members 110, 120 are fixed to each other by bolts 150 passing through respective annular valve shroud flanges 130, 140. The valve shroud flanges have opposed planar faces which meet in a plane which is inclined at 45° to the vertical actuator direction and to the horizontal flow axis of the valve channel.

Each valve shroud member 110, 120 has a planar side wall 250*a, b* with a respective circular opening. Similarly each valve shroud member 110, 120 has a planar upper/lower wall 270*a, b* with a respective circular opening. The actuator shaft 230 passes through the circular opening in the upper wall 270*a* of the first valve shroud member 110. The circular opening in the lower wall 270*b* of the second valve shroud member 120 contains a drain port fitting 280 which is connected to the lower wall 270*b* by fasteners 281. A drain pipe or drain hose (not shown) can be connected to a standard screwed fitting 282 (for example MS21902W8) at the bottom of the drain port fitting 280. In the event of a leakage from the valve channel 201, the leaked fuel flows by gravity to the low point of the valve shroud chamber 240 and then flows by the action of gravity out of the shroud through the fitting 280 and the drain pipe/hose.

Inclining the valve shroud flanges 130, 140 at an acute angle (in this case 45°) to the actuator shaft direction provides technical advantages compared with an alternative arrangement in which the interface between them is vertical (i.e. parallel to the actuator shaft direction). Firstly, it enables the actuator shaft 230 to pass through the first valve shroud member 110 but not through the second valve shroud member 120. This enables a simple interface to be provided between the actuator shaft 230 and the valve shroud member 110 (which will be described below) and also enables the valve to inspected by disassembling this interface without having to disassemble the pair of valve shroud members 110, 120 by removing the fasteners 150. Similarly, it enables the drain port fitting 280 to be held by only the second valve shroud member 120 and not the first valve shroud member 110. This enables a simple interface to be provided between the drain port fitting 280 and the valve shroud, and also enables the fitting 280 to be removed after removing the fasteners 281 without having to disassemble the valve shroud members 110, 120 by removing the fasteners 150. Once the fitting 280 has been removed then the valve can be visually inspected from below. Advantageously the valve shroud members 110, 120 have a substantially identical construction.

Each valve shroud member 110, 120 has a substantially spherical inner surface which faces towards the valve and defines an outer boundary of the valve shroud chamber 240. Each valve shroud member 110, 120 also has a substantially spherical outer surface facing away from the valve. This spherical shape provides an efficient transfer of load across the valve shroud. The spherical inner surface also avoids any local accumulation of liquid since all liquid in the chamber 240 runs by gravity to only a single point.

The first valve shroud member 110 is rigidly attached at its upper end by fasteners 162 to an actuator support comprising a tubular collar 160 with a flange 161. The valve can be inspected from above by removing the fasteners 162 and then removing the collar 160. A small mirror with a telescopic arm can then be inserted from above to see details of the lower surfaces of the valve.

The valve member 220 and actuator shaft 230 are carried by an actuator stem assembly 290 which includes a circular plate 291 carrying an O-ring 292. The O-ring provides a floating connection between the actuator stem assembly 290 and the collar 160, enabling the actuator stem assembly 290 to move relatively freely up and down relative to the valve shroud. This floating connection compensates for vertical tolerances thereby avoiding vertical axial stress in the connection between the actuator stem assembly and the collar 160.

The shrouded valve assembly 100 is connected on its left side to a first shrouded pipe assembly and on its right side to a second shrouded pipe assembly which will now be described. In the description below the left side of the valve is indicated as an inlet side and the right side is indicated as an outlet side. However the flow direction may be reversed so flow is in the opposite direction.

On the inlet (left) side of the valve is a first shrouded pipe assembly comprising an inner inlet pipe 210*a* and an inlet pipe shroud 211*a*. The inner inlet pipe 210*a* is in fluid communication with an inlet (left) end of the valve channel 201. The inlet pipe shroud 211*a* shrouds the inner inlet pipe 210*a* and provides an inlet pipe shroud chamber 212*a* between them. The inlet pipe shroud chamber 212*a* is in fluid communication 245 with an inlet (left) end of the valve shroud chamber 240 via holes in a spacer which will be described below.

The inner inlet pipe 210*a* and the inlet pipe shroud 211*a* have respective flanges 170,171 at their left ends which are joined by fasteners 172. The flange 170 has holes which permit liquid to flow through it as indicated by double-headed arrow 173, in and out of the inlet pipe shroud chamber 212*a*. The inlet pipe shroud 211*a* is rigidly connected to the valve shroud member 110 by fasteners 214*a* which pass through a flange 215 of the inlet pipe shroud 211*a* and the planar side wall 250*a* of the valve shroud member 110.

The valve pipe 200 has a first flange 202 at its inlet (left) end and a second flange 203 at its outlet (right) end. A rigid connector 247 rigidly connects the inlet pipe shroud 211*a* and the valve shroud member 110 to the valve pipe 200. The rigid connector 247 has a tubular body 241, a flange 242 at its left end and a flange 243 at its right end. The flange 242 is rigidly connected to the side wall 250*a* and to the flange 215 by the fasteners 214*a*. The flange 243 is rigidly connected to the flange 202 by fasteners 244.

The flange 242 of the rigid connector 247 has holes which allow liquid to pass from the valve shroud chamber 240 into the inlet pipe shroud chamber 212*a* and vice-versa as indicated by double-headed arrow 245. The flange 242 acts as a spacer, maintaining a fixed radial spacing between the inner pipes 200,210*a* and their respective shrouds. The flange 242 also provides a rigid connection between the tubular body 241 of the rigid connector 247 and the first valve shroud member 110.

The inner inlet pipe 210*a* is received within the tubular body 241 of the spacer, and an O-ring 246 makes a seal between them. This O-ring 246 provides a floating connection between the inner pipe 210*a* and the rigid connector 247, in other words the inner pipe 210*a* can move relatively freely to the right and left relative to the spacer. This floating connection compensates for horizontal tolerances between the inner pipe 210*a* and the rigid connector 247, thereby avoiding horizontal axial stress in the connection between them.

On the outlet side (right) of the valve is a second shrouded pipe assembly comprising an inner outlet pipe 210*b* and an outlet pipe shroud 211*b*. The inner outlet pipe 210*b* is in fluid communication with an outlet (right) end of the valve channel 201. The outlet pipe shroud 211*b* shrouds the inner outlet pipe 210*b* and provides an outlet pipe shroud chamber 212*b* between them. Similarly the outlet pipe shroud chamber 212*b* is in fluid communication with the outlet (right) end of the valve shroud chamber 240 via holes in a floating connector 300 which will be described below.

The inner outlet pipe 210*b* and the outlet pipe shroud 211*b* have respective flanges 170*b*,171*b* at their right ends which are joined by fasteners 172*b*. The flange 170*b* has holes which permit liquid to flow through it, in and out of the inlet pipe shroud chamber 212*a* as indicated by double-headed arrow 173*b*.

The outlet pipe shroud 211*b* is rigidly connected to the valve shroud member 120 by fasteners 214*b* which pass through a flange 213 of the outlet pipe shroud 211*b* and the planar side wall 250*b* of the valve shroud member 120.

A first floating connector 300 is provided between the valve shroud and the second shrouded pipe assembly 210*b*, 211*b*. The floating connector 300 comprises a pair of tubular parts 301,302 and a flange 303. The flange 303 has holes which allow liquid to pass from the valve shroud chamber 240 into the outlet pipe shroud chamber 212*b* and vice-versa as indicated by double-headed arrow 245*b*. The flange 303 acts as a spacer, maintaining a fixed radial spacing between the inner pipes 200,210*b* and their respective shrouds. The flange 303 also provides a rigid connection between the tubular body 301,302 of the rigid connector 300 and the second valve shroud member 120.

The inner outlet pipe 210*b* is received within the tubular body 302 of the spacer 300, and an O-ring 246*b* makes a seal between them. This O-ring 246*b* provides a floating connection between the inner pipe 210*b* and the spacer 300, in other words the inner pipe 210*b* can move relatively freely to the right and left relative to the spacer. This floating connection compensates for horizontal tolerances between the inner pipe and the floating connector 300, thereby avoiding horizontal axial stress in the connection between them.

The outlet pipe shroud 211*b* has a flange 213 at its inlet (left) end. The flange 213 is rigidly connected to the valve shroud member 120 and the flange 303 of the spacer 300 by fasteners 214*b* which pass through the flanges 213, 303 and into the planar side wall 250*b* of the valve shroud member 120.

A second floating connector 260 connects the first floating connector 300 to the valve pipe 200. The floating connector 260 has a tubular body 261 and a flange 262 at its left end. The flange 262 is rigidly connected to the flange 203 of the valve pipe 200 by fasteners 263. The right-hand end of the tubular body 261 is received within the tubular part 301 of the first floating connector 300 and an O-ring 264 makes a seal between them. This O-ring 264 provides a floating connection 440 between the first and second floating connectors 300, 260.

This floating connection 440 ensures that external loads pass between the first and second shrouded pipe assemblies via the valve shroud 110, 120 without passing through the valve 200 or the second floating connector 260. The shrouded valve assembly 100 is rigidly connected at its inlet (left) end to an aircraft structure (such as a fuselage). At its outlet (right) end the shrouded valve assembly 100 is rigidly connected to the same aircraft structure. During flight of the aircraft, aerodynamic forces will tend to cause the aircraft structure to flex or otherwise deflect which will in turn cause the connection points where the two sides of the assembly 100 are attached to the structure to move relative to each other. This movement will cause loads to be transmitted across the shrouded valve assembly 100. Loads can also be generated by internal pipe system pressure. It is desirable that such loads are not transmitted across the assembly 100 via the valve pipe 200 in order to protect the valve. The first and second shrouded pipe assemblies are rigidly connected to the valve shroud members 110, 120 by respective fasteners 214*a, b* which provide first and second rigid connections 410, 420. A third rigid connection 430 via the rigid connector 247 and fasteners 244 also connects the first shrouded pipe assembly 210*a*, 211*a* to the valve. A fourth connection 440 via the O-ring 264 connects the second shrouded pipe assembly 210*b*, 211*b* to the valve via the floating connectors 300, 260. This floating connection 440 is significantly more flexible than both the rigid connections 410, 420. As a result, load from the second shrouded pipe assembly (either from the inner outlet pipe 210*b* or from the outlet pipe shroud 211*b*) passes through the second rigid connection 420 into the valve shroud member 120, then into the valve shroud member 110, and then into the inlet pipe shroud 211*a* via the first rigid connection 410 with the valve shroud member 120. The floating connection 440 ensures that little or none of this load passes through the floating connector 260 and into the valve.

As well as preventing loads from passing through the valve, the floating connection 440 also compensates for horizontal tolerances between the floating connectors 300, 260, thereby avoiding horizontal axial stress in the connection between them.

Figure 2:
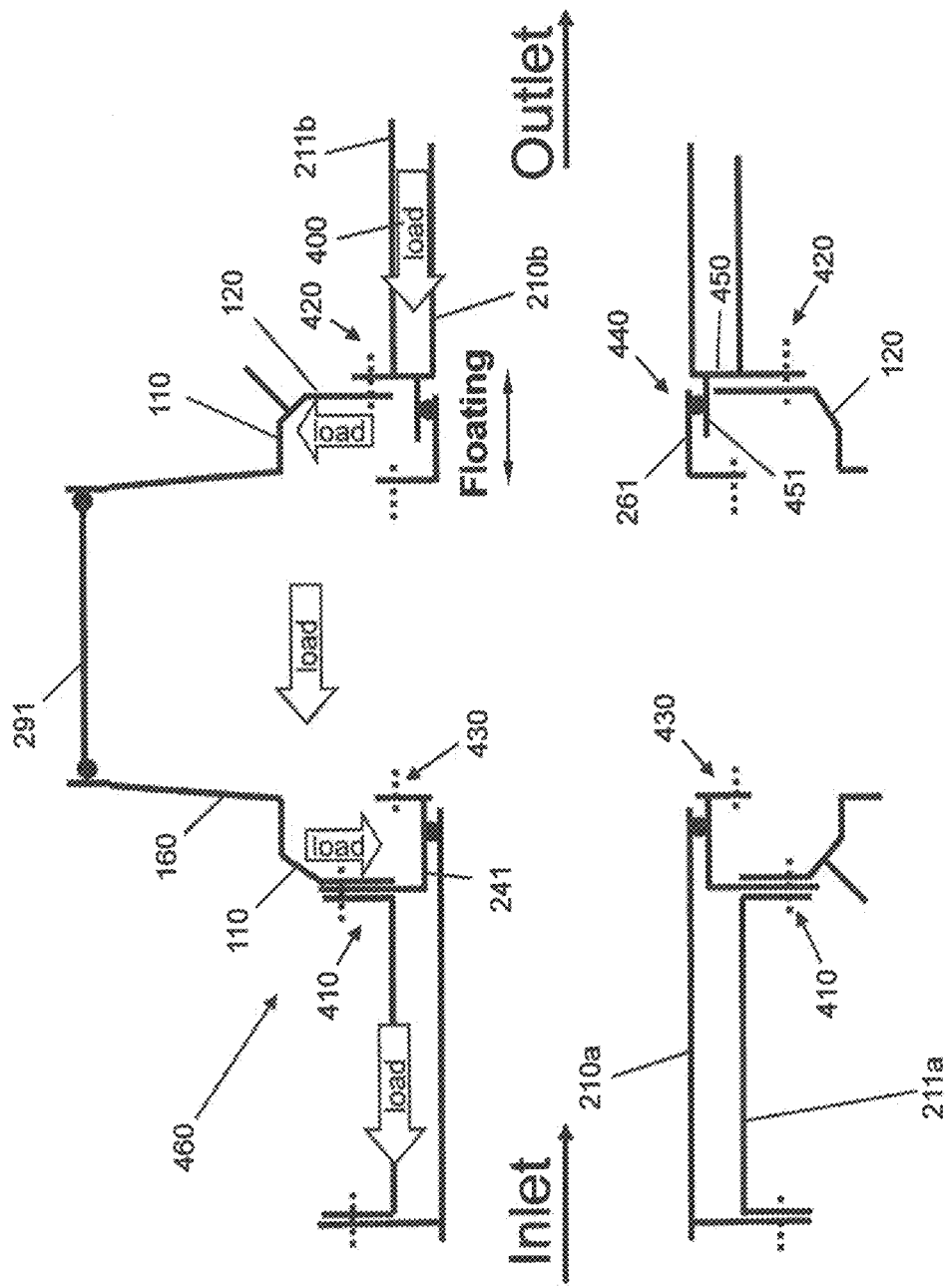
FIG. 2 is a schematic sectional view of a shrouded valve assembly according to a second embodiment of the disclosure herein.

Various parts of a shrouded valve assembly 460 according to a second embodiment of the disclosure herein are shown in FIG. 2. FIG. 2 is a schematic diagram which omits various elements for purposes of clarity. Many of the parts in the embodiment of the FIG. 2 have equivalents in the embodiment of FIG. 1, and are given the same reference numeral.

As with the embodiment of FIG. 1, the first and second shrouded pipe assemblies are connected to the valve shroud 110, 120 by respective first and second rigid connections 410, 420. The rigid connection 430 connects the first shrouded pipe assembly 210*a*, 211*a* to the valve (not shown). The floating connection 440 connects the second shrouded pipe assembly 210*b*, 211*b* to the valve and ensures that little or none of the load passes through fitting 261 and then through the valve. The dominant load path is shown in FIG. 2 by block arrows.

The embodiment of FIG. 2 differs from the embodiment of FIG. 1 in that there is no spacer 300 on the outlet side. Instead, the inner outlet pipe 210*b* and outlet pipe shroud 211*b* are rigidly connected to each other by a spacer web 450 which may be formed integrally with, or welded to, the pipe 210*b* and shroud 211*b*. The floating connection 440 with the fitting 261 is made by a tubular part 451 which may be formed integrally with, or welded to, the spacer web 450.

Figure 5:
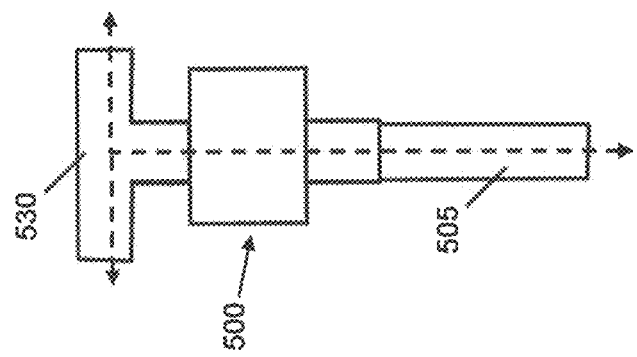
FIG. 5 is a schematic end view of the shrouded valve assembly of FIG. 3 installed on an aircraft.
Figure 4:
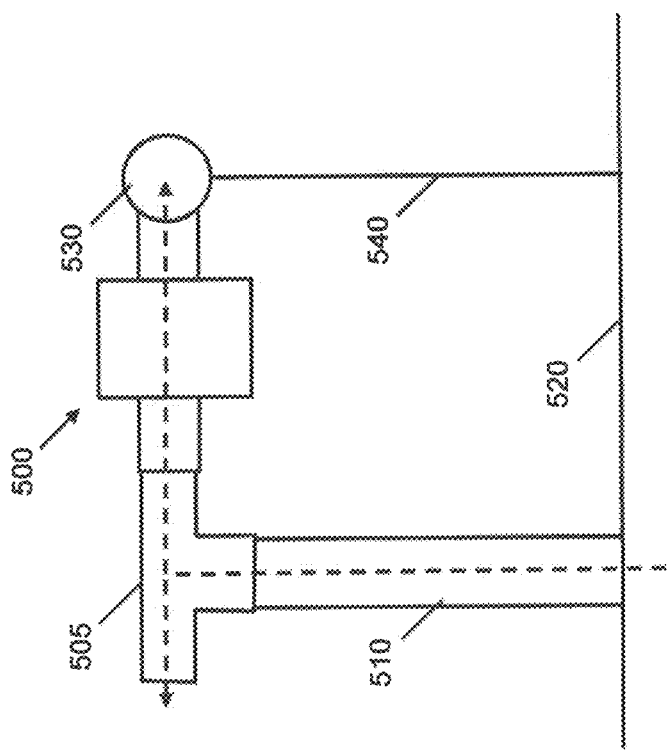
FIG. 4 is a schematic side view of the shrouded valve assembly of FIG. 3 installed on an aircraft.

A shrouded valve assembly 500 according to a third embodiment of the disclosure herein is shown in FIGS. 3-5. Many of the parts in the embodiment of FIGS. 3-5 have equivalents in the embodiments of FIGS. 1 and 2, and are given the same reference numeral.

The embodiment of FIG. 3 differs from the embodiment of FIG. 1 in that there are no holes in the flange 170. By omitting the holes in the flange 170, the system is divided into two separate sub-systems fitted together at this flange 170. The embodiment of FIG. 3 also differs from the embodiment of FIG. 1 in that a T-fitting 530 is provided on the outlet side of the valve. Six holes 550 are shown in the fitting 530, and the holes in the parts 170, 242, 303 and 170*b* (in FIG. 1) have a similar size and shape.

As shown in FIGS. 4 and 5, the shrouded valve assembly 500 is connected at its inlet (left) end to an aircraft structure 520 (such as a fuselage) via a T-fitting 505 and a pipe 510. Fuel pumped vertically through the pipe 510 thus can pass into the assembly 500 via the T-fitting 505. At its outlet (right) end the shrouded valve assembly 500 is connected to the same aircraft structure 520 via the T-fitting 530 and a rigid rod 540. During flight of the aircraft, aerodynamic forces will tend to cause the structure 520 to flex or otherwise deflect which will in turn cause the connection points where the pipe 510 and the rod 540 are attached to the structure to move relative to each other. This movement will cause loads to be transmitted across the shrouded valve assembly 500. The floating connection ensures that such loads are not transmitted across the assembly 500 via the valve pipe.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or is priority.

The invention claimed is:

1. A shrouded valve assembly comprising:
a valve comprising a valve pipe with a valve channel, and a valve member in the valve channel which is operable to regulate a flow of fluid through the valve channel;
a valve shroud which shrouds the valve pipe and provides a valve shroud chamber between the valve pipe and the valve shroud, the valve shroud comprising first and second valve shroud members which are fixed to each other via respective valve shroud member flanges; and
an actuator shaft which passes through the valve shroud and the valve pipe to the valve member and can move to operate the valve member to regulate the flow of fluid through the valve channel, the actuator shaft extending in an actuator shaft direction as it passes through the valve shroud and the valve pipe;
wherein the valve shroud flanges meet at a valve shroud interface which is inclined at an acute angle to the actuator shaft direction, and wherein the actuator shaft passes through the first valve shroud member but not through the second valve shroud member.

2. The shrouded valve assembly of claim 1, wherein each valve shroud member has a substantially spherical inner surface which defines an outer boundary of the valve shroud chamber.

3. The shrouded valve assembly of claim 2, wherein each valve shroud member has a substantially spherical outer surface.

4. The shrouded valve assembly of claim 1, further comprising a drain port which passes through the second valve shroud member but not through the first valve shroud member, wherein the drain port is configured to enable fluid to be drained out of the valve shroud chamber through the drain port.

5. The shrouded valve assembly of claim 1, further comprising a drain port fitting which is fitted to the second valve shroud member, wherein the drain port is configured to enable fluid to be drained out of the valve shroud chamber through the drain port fitting.

6. The shrouded valve assembly of claim 1, wherein the acute angle is greater than 40 degrees and less than 50 degrees.

7. The shrouded valve assembly of claim 1, wherein the valve channel extends in a valve channel direction, and the valve shroud interface is inclined at an acute angle to the valve channel direction.

8. The shrouded valve assembly of claim 1, wherein the valve shroud interface lies in a single plane, and the single plane is inclined at the acute angle to the actuator direction.

9. The shrouded valve assembly of claim 1, wherein the first and second valve shroud members are fixed to each other by fasteners passing through the valve shroud member flanges.

10. The shrouded valve assembly of claim 1, further comprising: first and second shrouded pipe assemblies attached to the valve shroud, each shrouded pipe assembly comprising a pipe in fluid communication with a respective end of the valve channel, and a pipe shroud which shrouds the pipe and provides a pipe shroud chamber between the pipe and the pipe shroud.

11. The shrouded valve assembly of claim 10, wherein the pipe of each shrouded pipe assembly is in fluid communication with a respective end of the valve channel through one of the valve shroud members but not the other.

12. The shrouded valve assembly of claim 10, wherein the first and second shrouded pipe assemblies are connected to the valve shroud by respective first and second connections and to the valve by respective third and fourth connections, and wherein the third or fourth connection is more flexible than both the first connection and the second connection.

13. The shrouded valve assembly of claim 1, wherein the assembly is connected to an aircraft structure.

14. The shrouded valve assembly of claim 1, wherein the first and second valve shroud members have a substantially identical construction.

* * * * *